United States Patent [19]

Selman

[11] 4,287,091

[45] * Sep. 1, 1981

[54] POLYMERIZATION CATALYSTS

[75] Inventor: Charles M. Selman, Bartlesville, Okla.

[73] Assignee: Phillips Petroleum Co., Bartlesville, Okla.

[*] Notice: The portion of the term of this patent subsequent to Jan. 20, 1998, has been disclaimed.

[21] Appl. No.: 63,879

[22] Filed: Aug. 3, 1979

[51] Int. Cl.$^3$ .............................................. C08F 4/64
[52] U.S. Cl. .......................... 252/429 B; 252/429 C; 526/127; 526/139; 526/144; 526/116; 526/122; 526/151
[58] Field of Search ........................ 252/429 B, 429 C

[56] References Cited

U.S. PATENT DOCUMENTS

| 3,412,174 | 11/1968 | Kroll | 252/429 C X |
|---|---|---|---|
| 3,718,635 | 2/1973 | Tomoshier et al. | 252/429 C X |
| 3,781,220 | 12/1973 | Shilov et al. | 252/429 C X |
| 3,801,558 | 4/1974 | Fletcher et al. | 252/429 C X |
| 4,048,415 | 9/1977 | Matsuzawa et al. | 252/429 B X |
| 4,098,907 | 7/1978 | Tokunaga et al. | 252/429 C X |

FOREIGN PATENT DOCUMENTS 1359547 7/1974 United Kingdom ................ 252/429 C Primary Examiner—Patrick Garvin

[57] ABSTRACT

Polymerization, catalysts, and preparation thereof comprising milling magnesium metal, an organic halide, and titanium tetrahalide or the milled product in the presence of at least one of magnesium oxide, a triaryl phosphite, a polymeric material, titanium tetrahalide, vanadium tetrahalide, silicon tetrahalide, and an aluminum trihalide. The milled catalyst component can be heat treated prior to activation. The milled titanium catalyst component is activated with an organoaluminum activator producing a catalyst for olefin polymerization.

29 Claims, No Drawings

POLYMERIZATION CATALYSTS

This invention relates to polymerization, polymerization catalysts, and to the preparation of polymerization catalysts. In accordance with one aspect, this invention relates to the preparation of improved modified polymerization catalysts comprising magnesium alkyl reduced titanium tetrahalide wherein milling of the basic performed titanium catalyst is carried out in the presence of at least one of tin tetrahalide, vanadium tetrahalide, and silicon tetrahalide. In accordance with another aspect, solventless magnesium alkyl reduced titanium tetrahalide catalysts are prepared by milling in the presence of at least one of tin tetrahalide, vanadium tetrahalide, silicon tetrahalide, magnesium oxide, and a polymeric material. In accordance with a further aspect, milled titanium containing catalysts prepared according to the invention are subjected to heat treatment at an elevated temperature following milling. In accordance with another aspect, modified polymerization catalysts are prepared by milling magnesium metal, an organic halide, and a titanium tetrahalide in the presence of a metal tetrahalide, magnesium oxide, or polymeric material as set forth above followed by subsequent milling in the presence of at least one of additional metal halide, and a triaryl phosphite prior to activation with an organoaluminum activator. In a further aspect, the above catalysts are useful for the polymerization of olefins, especially for propylene.

It is known to reduce titanium tetrahalide with a true Grignard reagent, that is, a compound or mixture of compounds produced by reacting magnesium and an organic halide in the presence of an ether. Such a compound is conventionally expressed as RMgX. It is also known to produce what is termed in the art as a "solventless" Grignard, which is produced by reacting magnesium metal with an organic halide in the presence of a solvent which is designated as a non-solvating solvent (i.e., an inert or non-complexing diluent) such as a hydrocarbon as distinguished from an ether.

True Grignard reagents as a practical matter present serious problems as reducing agents in the production of high activity catalysts in view of the difficulty in removing the large amounts of remaining ether which can reduce the effectiveness of such Gringnard reagents used in preparing olefin polymerization catalyst systems.

In certain olefin polymerizations, it is necessary to tailor the catalyst to give the type of polymer desired. Particularly in the polymerization of propylene, it is desirable to cause the polymerization to take place in such a manner as to give a stereospecific polymer.

Accordingly, an object of this invention is to provide a process for the production of an improved catalyst component.

A further object of this invention is to provide a polymerization catalyst component exhibiting significant improvement in catalyst activity and/or decreased soluble polymer formation.

Another object of this invention is to provide a stereospecific catalyst system.

A further object of this invention is to provide simplified methods of producing a titanium catalyst component for olefin polymerization.

A further object of this invention is to provide for the stereospecific polymerization of propylene.

Other objects, aspects, and the several advantages of this invention will become apparent to those skilled in the art upon a study of the specification and the appended claims.

In accordance with the invention, a titanium catalyst component is prepared by milling magnesium metal, an organic halide and a titanium tetrahalide in the presence of at least one of tin tetrahalide, vanadium tetrahalide, and silicon tetrachloride and, optionally, in the presence of at least one of magnesium oxide, a triaryl phosphite, and a polymeric material.

In accordance with one embodiment of the invention, a titanium catalyst component is prepared by intensive milling of magnesium metal, an organic halide, a titanium tetrahalide, and at least one of tin tetrahalide, vanadium tetrahalide, and silicon tetrahalide under conditions to form a titanium catalyst component which is then further milled in the presence of at least one of additional metal halide and a triaryl phosphite.

In accordance with a further embodiment of the invention, a modified titanium catalyst component is prepared by milling titanium tetrahalide with magnesium metal, and an organic halide as described above in the absence of a complexing diluent and subsequent milling of the modified catalyst in the presence of at least one of additional metal halide as set forth above, a triaryl phosphite, and an aluminum trihalide.

In accordance with a specific embodiment, a titanium catalyst component is prepared by milling together magnesium metal, an organic halide, and a titanium tetrahalide and then milling the resulting product with a triaryl phosphite, e.g., triphenyl phosphite, and additional tin tetrahalide, e.g., tin tetrachloride, prior to combining with an organoaluminum activator.

In accordance with an additional embodiment, the milled products described above can be subjected to heat treatment to further reduce the formation of soluble polymers during polymerization.

The catalysts prepared according to this invention represent an improvement of the solventless magnesium alkyl reduced titanium tetrachloride (SMART) catalysts as disclosed and claimed in Ser. No. 958,870, filed Nov. 8, 1978 and now U.S. Pat. No. 4,246,384. A SMART catalyst can be prepared, for example, by ball milling about equal quantities (molar) of magnesium powder, a hydrocarbon halide such as n-pentyl chloride, and a titanium tetrahalide such as titanium tetrachloride for sufficient time, e.g., 3 hours, to produce a catalyst active for propylene polymerization when used with an organoaluminum compound as cocatalyst.

In actual operation, the catalyst of this invention can be produced in the following ways:

(1) Mill performed SMART catalyst with at least one metal chloride selected from tin tetrachloride, vanadium tetrachloride, and silicon tetrachloride in the absence or presence of a triaryl phosphite. Preferably, the triaryl phosphite is present since good yields of polymer result with relatively little soluble polymer formed. The preferred phosphite is triphenyl phosphite.

(2) The SMART catalyst is prepared in the presence of at least one component selected from tin tetrachloride, vanadium tetrachloride, silicon tetrachloride, magnesium oxide, and a polymeric material such as poly(phenylene sulfide). The polymeric material is required to have a melting point higher than the polymer to be prepared with the catalyst system and to be inert in the polymerization process. For example, when ethylene polymers are to be produced, the polymeric material can be polypropylene, poly(phenylene sulfide), poly(phenylene oxide), and the like.

(3) The modified, preformed SMART catalyst can be milled in the presence of additional metal chloride as enumerated above as well as $AlCl_3$, preferably tin tetrachloride, and a triaryl phosphite, preferably triphenyl phosphite, in the best mode of this invention. The catalysts are preferably heat treated for best results.

The milled catalyst components as prepared herein can be heat treated prior to combining with an organoaluminum activator. The resulting product is found to exhibit a significant improvement in catalyst activity and/or decreased soluble polymer formation during propylene polymerization compared to the results obtained with the basic (unmodified) SMART catalyst.

The organic halide can be a saturated or unsaturated hydrocarbyl halide having the formula RX in which X represents a halogen, preferably chlorine or bromine, and R is selected from an alkynyl, alkenyl, alkyl, aryl, cycloalkenyl or cycloalkyl radical and combinations thereof such as arylalkyl, and the like containing from 1 to about 12 carbon atoms per molecule. The organic halide can also be a polyhalogenated hydrocarbyl halide of the formula $R'X_2$ where X is a halogen atom as before and R' is a saturated divalent aliphatic hydrocarbyl radical, containing from 2 to about 10 carbon atoms per molecule. Exemplary compounds include 1,2-dibromoethane, 1,4-dichlorobutane, cyclohexyl chloride, bromobenzene, 1,10-dibromodecane and the like. An alkyl halide is presently preferred, however, containing from 1 to about 12 carbon atoms. Representative alkyl halides include methyl chloride, n-butyl bromide, n-pentyl chloride, n-dodecyl chloride and the like. A primary alkyl halide such as n-pentyl chloride is most preferred.

The magnesium is in the form of the free metal, preferably in the form of a powder.

The magnesium metal and organic halide are preferably reacted in stoichiometric amounts, although this can vary from 0.25:1 to 1:0.25 preferably from 0.75:1 to 1:1 gram atoms Mg:moles of organic halide.

The titanium tetrahalide is titanium tetrachloride, titanium tetrabromide, or titanium tetraiodide, preferably titanium tetrachloride.

As set forth above, the basic SMART catalyst is milled in the presence of a tin tetrahalide. Although any tin tetrahalide can be used, it is presently preferred to use tin tetrachloride. Other tin tetrahalides that can be used include tin tetrabromide.

The amount of tin tetrahalide milled with the basic SMART catalyst can range from about 0.05 to 0.2 moles per mole of titanium present.

As indicated above, the basic SMART catalyst can also be milled in the presence of magnesium oxide or a polymeric material. The amount of magnesium oxide or polymeric material based upon the weight of basic SMART catalyst can range from about 2 to about 50 wt. percent.

The triaryl phosphites contemplated can be expressed as $(R''''O)_3P$ where $R''''$ is aryl, alkyl-substituted aryl, cycloalkyl-substituted aryl and aryl-substituted aryl wherein the basic unsubstituted aryl has from 6 to 14 carbon atoms and the alkyl, cycloalkyl and aryl substituents have 1 to about 10 carbon atoms.

Exemplary triaryl phosphite compounds that can be used include triphenyl phosphite, tri-1-naphthyl phosphite, tri-9-anthryl phosphite, tri-4-phenanthryl phosphite, tri-o-tolyl phosphite, tri-p-cumenyl phosphite, tris(4-pentyl-1-naphthyl) phosphite, tris(3-heptyl-1-anthryl) phosphite, tris(5-decyl-2-phenanthryl) phosphite, tris(3-cyclobutylphenyl) phosphite, tris(6-cycloheptyl-2-naphthyl) phosphite, tris(10-cyclodecyl-9-anthryl) phosphite, tris(3-cyclopentylphenyl) phosphite, tris [4-(2-naphthyl)phenyl] phosphite, tris (7-phenyl-1-naphthyl) phosphite, tris(6-phenyl-2-anthryl) phosphite, tris (7-phenyl-1-phenanthryl) phosphite and the like. A presently preferred compound because of ready availability and relatively low cost is triphenyl phosphite.

The anhydrous aluminum trihalide can be expressed as $AlX_3$ were X is bromide, chloride, fluoride, iodide and mixtures. Presently preferred because of availability and relative low cost is aluminum trichloride.

The weight ratio of SMART catalyst to triaryl phosphite and to aluminum trihalide or other metal halides can range from about 2 to 1 to 200 to 1. Based on the calculated content of $TiCl_3$ present in the SMART catalyst, the calculated mole ratio of $TiCl_3$:triaryl phosphite can range from about 4:1 to 100:1, and the calculated mole ratio of $TiCl_3$:$AlX_3$ can range from about 1.5:1 to 40:1.

The organoaluminum compound activator component of this invention consists of trialkylaluminum compounds of formula $AlR''_3$, dialkylaluminum compound of formula $R''_2AlZ$, alkyl aluminum compounds of the formula $R''AlZ_2$ and dialkylaluminum alkoxides of formula $R''_2 AlOR''$ wherein each R'' may be the same or different and represents an alkyl group containing from 1 to about 12 carbon atoms per molecule. However, a trialkylaluminum compound is preferred, which can be admixed with one or more of the other activator compounds listed. Z represents either a hydrogen atom or a halogen atom, preferably chlorine or bromine. Preferably the $R''AlZ_2$ compounds are dichlorides of dibromides. Examples of suitable compounds include trimethylaluminum, triethylaluminum, tri-n-dodecylaluminum, dimethylethylaluminum, dimethylaluminum bromide, diethylaluminum chloride, ethylaluminum dichloride, ethylaluminum dihydride, diisobutylaluminum bromide, di-n-dodecylaluminum chloride, ethyl-t-butylaluminum chloride, diisobutylaluminum hydride, dimethylaluminum butoxide, diethylaluminum ethoxide, di-n-dodecylaluminum n-propoxide, and ethylmethylaluminum ethoxide and mixtures thereof. Triethylaluminum is preferred. It is also within the scope of this invention to use an organoaluminum monohalide (previously described) in combination with additional magnesium reducing agent (previously described) as the activator component of the polymerization catalyst system. For ethylene polymerization, the organoaluminum activator preferably consists essentially of triethylaluminum.

It is preferred to use one or more adjuvants which are polar organic compounds, i.e., electron donor compounds (Lewis bases) in addition to the magnesium reduced titanium catalyst component and activator.

These may be precontacted with the activator or titanium tetrahalide or introduced at the same time the titanium tetrahalide is introduced into contact with the magnesium reducing agent or both. Preferably the activator is precontacted with an aromatic ester adjuvant as described in detail hereinbelow.

Suitable compounds for this purpose are described in U.S. Pat. No. 3,642,746 the disclosure of which is hereby incorporated by reference. They include amides, amines, aldehydes, arsines, alcoholates, esters, ethers, ketones, nitriles, phosphines, phosphites, phosphoramides, stibines, sulfones and sulfoxides. Exemplary compounds include triethylamine, acetamide, benzaldehyde, sodium ethoxide, ethyl acetate, diethyl ether, acetone, benzonitrile, triphenyl phosphine, triphenyl phosphite, hexamethyl phosphoric triamide, triethyl stibine, trioctyl arsine, dimethyl sulfone and dibutyl sulfoxide.

Presently preferred adjuvants, when premixed with the organoaluminum compounds, are the lower alkyl esters (i.e., 1 to 4 carbon atoms per molecule) of benzoic acid which may be additionally substituted in the para position to the carboxyl group with a monovalent radical selected from the group consisting of —F, —Cl, —Br, —I, —OH, —OR''', —COCR''', —SH, —NH, —NR'''$_2$, —NHCOR''', —NO$_2$, —CN, —CHO, —COOR', —CONH$_2$, —CONR$_2$''', —SO$_2$R''', and —CF$_3$. The R''' group is a 1-4 carbon atom alkyl radical. Examples of suitable compounds include ethyl anisate (p-methoxybenzoate), ethyl benzoate, methyl benzoate, ethyl p-dimethylaminobenzoate, ethyl p-fluorobenzoate, isopropyl p-diethylaminobenzoate, butyl p-fluorobenzoate, n-propyl p-cyanobenzoate, ethyl p-trifluoromethylbenzoate, methyl p-hydroxybenzoate, methyl p-acetylbenzoate, methyl p-nitrobenzoate, ethyl p-mercaptobenzoate and mixtures thereof. Particularly preferred esters are ethyl anisate and ethyl benzoate. Triphenyl phosphite, triethylamine and dimethylaniline are preferred for mixing with the other components as they are contacted. As noted hereinabove, another adjuvant such as ethyl anisate or ethyl benzoate may already be mixed with the organoaluminum compound.

If one or more adjuvants are used with the titanium tetrahalide component, the molar ratio of titanium tetrahalide compound to adjuvant (or adjuvants) is generally in the range of about 1:1 to about 200:1.

If one or more adjuvants are used with the organoaluminum compound or compounds in the activator component, the molar ratio of organoaluminum compound(s) component to adjuvant (or adjuvants) is generally in the range of about 1:1 to about 350:1. However, in no instance should the total adjuvant from all sources exceed a 1:1 mole ratio of adjuvant to aluminum.

In propylene polymerization, it is preferred to employ about equal molar amounts of each type of organoaluminum compounds, e.g., triethylaluminum and diethylaluminum chloride since good catalyst productivity is promoted. However, the mole ratios can vary from about 1:3 to 3:1. Generally, the total amount of organoaluminum compounds employed in a 1 liter reactor containing from about 0.06 to 0.2 g of catalyst calculated as TiCl$_3$ can range from about 4–12 mmoles and more preferably from about 8 to 10 mmoles. The calculated mole ratio of total organoaluminum compounds to TiCl$_3$ can range from about 25:1 to 1000:1 and more preferably from about 35:1 to 650:1 since highest productivity is favored in this range. The calculated mole ratio of total organoaluminum compounds to ester, e.g., ethyl anisate, in the cocatalyst can range from about 2.5:1 to 3.2:1, preferably 2.6:1 to 3.0:1, since good productivity coupled with good stereospecificity are found in these ranges. The calculated mole ratio of ester to TiCl$_3$ can range from about 10:1 to about 500:1.

Generally, the mole ratio of triaryl phosphite to metal chloride employed in the modified SMART catalysts ranges from about 0.5:1 to about 1:1. However, it can range from about 0.03:1 to about 6:1.

The SMART catalyst and the adjuvants are intensively milled together for about 0.5 to 100 hours at ambient conditions by means of a ball mill, rod mill, vibrating mill, and the like. Cooling of the mill can be employed, if desired, to keep the temperature of milling material within a specified temperature range, e.g., 25°–75° C., if desired. An atmosphere, inert in the process such as nitrogen, argon, etc., can be employed in the milling vessel.

It is within the scope of the invention to subject the milled titanium catalyst component to a suitable heat treatment to reduce the production of polymer solubles. The milled catalysts can be subjected to heat treatment at a temperature of about 50° C. to 250° C. under a pressure of about 0.5 psia to 5 psia (51–510 kPa) for a period of time ranging from about 10 minutes to about 5 hours.

The catalysts of this invention are suitable for the polymerization of at least one aliphatic mono-1-olefin containing 2 to 8 carbon atoms per molecule. The catalysts are particularly suitable for the stereospecific polymerization of propylene.

The conditions suitable for carrying out the polymerization reaction are similar to other related processes in which a catalyst system comprising reduced titanium is employed. The process is conveniently carried out in liquid phase in the presence or absence of an inert hydrocarbon diluent, e.g., n-heptane, n-pentane, isobutane, cyclohexane, etc., but it is not limited to liquid phase conditions. If no added diluent is used, the process can be carried out in liquid monomer which is preferred.

The polymerization temperature employed depends on the monomer employed and the mode of reaction selected but generally falls within the range of 60°–212° F. (15.5°–100° C.). In the liquid phase polymerization of propylene, for example, a temperature in the range of about 75° to about 200° F. (24°–93° C.) can be employed. Any convenient pressure is used. However, in liquid phase operation, sufficient pressure is employed to maintain the reactants in liquid phase within the reaction zone.

Gram atom ratios of Ti/Mg used in the catalyst preparation are preferably from 0.5:1 to 5:1, more preferably 0.75:1 to 1.25:1. Ratios below 0.5:1 are operable but give lower productivities. The actual ratio in the catalyst itself will be slightly lower than that used in its preparation.

As is known in the art, control of the molecular weight of the polymer is readily achieved by the presence of small amounts of hydrogen during the polymerization.

The polymers prepared with the catalysts of this invention are normally solid resinous materials which can be extruded, molded, etc., into useful articles including film, fibers, containers and the like.

EXAMPLE I

The SMART catalyst, already milled, is milled with an additive, e.g., SnCl$_4$, to modify it.

Preparation of Basic SMART Catalyst A (Control)

A 1 liter, spherical steel vessel containing 1400 g of 1.3 cm diameter steel balls was charged, in order, with 12.0 g (0.5 mole) of 50 mesh (U.S. Sieve Series) magnesium powder, 61 ml (0.5 mole, 53.5 g) of n-pentyl chloride, and 55 ml (0.5 mole, 94.8 g) of titanium tetrachloride. The vessel was placed on a Vibratom Model 6L-B mill (a vibratory mill manufactured by Siebtechnik GMBH, Mulheim, West Germany, which operates at a frequency of 1760 cycles per minute at an amplitude of about 9 mm) and a 3.7 hour milling time at ambient conditions was employed. The vessel was moved to a dry box where its contents were transferred to a 0.95 liter bottle and the bottle filled with dry n-hexane. The product was stored in this fashion for 11 weeks (for convenience) at about 23° C. then the product was recovered by filtering on a fritted funnel and washing with 3-800 ml portions of dry n-hexane. The washed material was vacuum dried about 6 hours and sieved through a 50 mesh screen yielding 75 g of a purple colored solid.

Catalyst B (Invention)

A 5 g sample of base SMART Catalyst A, already milled, and 0.36 ml SnCl$_4$ (0.80 g, 3.1 mmoles) was milled for 2.75 hours in a 250 ml steel vessel with 300 g of 0.95 cm steel balls on the Vibratom. Cooling tap water at about 20° C. was run over the vessel during the milling. Following milling, the vessel and contents were heated for 1 hour at 95° C. and cooled to about 23° C. before returning to the dry box. The grayish-brown sample was recovered by sieving through a 50 mesh screen. Catalyst B is calculated to contain about 86 wt. % Catalyst A and 14 wt. % SnCl$_4$. Since the base SMART catalyst is calculated to contain about 50 wt. % TiCl$_3$, a 5 g portion of it contains about 2.5 g (16.2 mmoles) of TiCl$_3$. In Catalyst B, therefore, the calculated mole ratio of TiCl$_3$:SnCl$_4$ is 5.2:1.

Catalyst C (Control)

A 5 g sample of base SMART Catalyst A, already milled, and 1.13 g triphenylphosphite (TPP) (3.6 mmoles) was milled for 2.8 hours on the Vibratom in the manner described for Catalyst B. The vessel and contents were post heated for 1 hour at 95° C. The recovered product was brown in color.

Catalysts D and E (Invention)

In two different 250 ml steel vessels, each containing 300 g of 0.95 cm steel balls, was charged 5 g of base SMART Catalyst A, already milled, 0.77 g TPP (2.5 mmoles), an 0.80 g SnCl$_4$. Each vessel was placed on the Vibratom and milled for 2.5 hours in the manner previously described. Catalyst D was recovered as before without undergoing any post heat treatment. Catalyst E was post heated and recovered in the manner described for Catalyst B. Catalysts D and E were red-brown in color. In each catalyst, Catalyst A is calculated to be about 76 wt. %, TPP to be 12 wt. % and SnCl$_4$ to be 12 wt. %. The calculated mole ratios are: TiCl$_3$:TPP of 6.5:1 and TiCl$_3$:SnCl$_4$ of 5.2:1.

Catalysts F and G (Invention)

Two different 250 ml vessels were employed as for Catalysts D and E. One vessel was charged with 5 g of base SMART Catalyst A, already milled, 0.8 g VCl$_4$ (4.1 mmoles), and 0.8 g TPP (2.6 mmoles). The second vessel was charged with 5 g of base SMART Catalyst A, already milled, 0.8 g SiCl$_4$ (4.7 mmoles) and 0.8 g TPP. Each vessel was placed on the Vibratom and milled for 2 hours are described for Catalysts D and E. Each catalyst was post heated and recovered as before yielding reddish-brown material. Catalyst F is calculated to contain 76 wt. % Catalyst A, 12 wt. % TPP, and 12 wt. % VCl$_4$. The calculated mole ratios are: TiCl$_3$:VCl$_4$ of 4:1, TiCl$_3$:TPP of 6.2:1. Catalyst G is calculated to contain 76 wt. % Catalyst A, 12 wt. % TPP, and 12 wt. % SiCl$_4$. The calculated mole ratios are: TiCl$_3$:SiCl$_4$ of 3.4:1 and TiCl$_3$:TPP of 6.2:1.

Base SMART Catalyst A$^2$ (Control)

This is a repeat preparation of base SMART Catalyst A employing the same quantities of reagents and the same milling procedure as before except a milling time of about 5½ hours was utilized. The milling vessel containing the product was returned to the dry box and the contents flushed into a 0.95 liter bottle with dry n-hexane where the purple colored solid settled quickly. The liquid was decanted, replaced with fresh dry n-hexane, mixed with the product and the product allowed to settle. The decanting process was repeated three times. Then the solid material was filtered on a fritted funnel, washed with 3-800 ml portions of dry n-hexane, and vacuum dried for 4 hours. The product was sieved throug a 50 mesh screen yielding 70 g of a purple colored solid.

Catalyst H (Invention)

A 5 g sample of base SMART Catalyst A$^2$, already milled, 0.77 g TPP, and 0.80 g SnCl$^4$, was charged to a 250 ml vessel containing steel balls, placed on the Vibratom and milled for 4.5 hours in the manner described previously except that chilled water at about 10° C. was run over the vessel during milling. The vessel and contents were post heated for 1 hour at 95° C. and the contents recovered as described before yielding a brownish-maroon colored material. The weight ratios and calculated mole ratios employed are the same as for Catalysts D and E.

EXAMPLE II

Propylene was polymerized in a 1 liter stirred reactor employing the specified catalyst. The reactor was conditioned for each run by charging it with 900 ml of dry n-hexane containing 2.5 mmoles diethylaluminum chloride (DEAC) and heating reactor and contents to 120° C. for 1 hour. The contents were then pressured out with dry nitrogen and the nitrogen in turn purged with propylene vapors. The reactor was then cooled to about 23° C. The cocatalyst, a triethylaluminum/ethyl anisate complex (TEA/EA mole ratio of 3.5:1), was charged, then the catalyst, DEAC, 0.5 liter hydrogen (STP), and about a liter of liquid propylene. The reactor and contents were heated to 70° C. and polymerization conducted for 1 hour or as specified. Sufficient propylene was added as required from a pressurized reservoir during each run to maintain the reactor liquid full. After each run, the reactor contents were removed and the polymer was washed with methanol and dried under vacuum.

The quantities of components employed and results obtained are given in Tables 1A and 1B. Productivity is determined by dividing the polymer yield in grams by the catalyst weight in grams and is expressd as g polymer per g catalyst per unit time (usually 1 hour). Xylene Suitable compounds for this purpose are described in U.S. Pat. No. 3,642,746 the disclosure of which is hereby incorporated by reference. They include amides, amines, aldehydes, arsines, alcoholates, esters, ethers, ketones, nitriles, phosphines, phosphites, phosphoramides, stibines, sulfones and sulfoxides. Exemplary compounds include triethylamine, acetamide, benzaldehyde, sodium ethoxide, ethyl acetate, diethyl ether, acetone, benzonitrile, triphenyl phosphine, triphenyl phosphite, hexamethyl phosphoric triamide, triethyl stibine, trioctyl arsine, dimethyl sulfone and dibutyl sulfoxide.

Presently preferred adjuvants, when premixed with the organoaluminum compounds, are the lower alkyl esters (i.e., 1 to 4 carbon atoms per molecule) of benzoic acid which may be additionally substituted in the para position to the carboxyl group with a monovalent radical selected from the group consisting of —F, —Cl, —Br, —I, —OH, —OR''', —COCR''', —SH, —NH, —NR'''$_2$, —NHCOR''', —NO$_2$, —CN, —CHO, —COOR', —CONH$_2$, —CONR$_2$''', —SO$_2$R''', and —CF$_3$. The R''' group is a 1-4 carbon atom alkyl radical. Examples of suitable compounds include ethyl anisate (p-methoxybenzoate), ethyl benzoate, methyl benzoate, ethyl p-dimethylaminobenzoate, ethyl p-fluorobenzoate, isopropyl p-diethylaminobenzoate, butyl p-fluorobenzoate, n-propyl p-cyanobenzoate, ethyl p-trifluoromethylbenzoate, methyl p-hydroxybenzoate, methyl p-acetylbenzoate, methyl p-nitrobenzoate, ethyl p-mercaptobenzoate and mixtures thereof. Particularly preferred esters are ethyl anisate and ethyl benzoate. Triphenyl phosphite, triethylamine and dimethylaniline are preferred for mixing with the other components as they are contacted. As noted hereinabove, another adjuvant such as ethyl anisate or ethyl benzoate may already be mixed with the organoaluminum compound.

If one or more adjuvants are used with the titanium tetrahalide component, the molar ratio of titanium tetrahalide compound to adjuvant (or adjuvants) is generally in the range of about 1:1 to about 200:1.

If one or more adjuvants are used with the organoaluminum compound or compounds in the activator component, the molar ratio of organoaluminum compound(s) component to adjuvant (or adjuvants) is generally in the range of about 1:1 to about 350:1. However, in no instance should the total adjuvant from all sources exceed a 1:1 mole ratio of adjuvant to aluminum.

In propylene polymerization, it is preferred to employ about equal molar amounts of each type of organoaluminum compounds, e.g., triethylaluminum and diethylaluminum chloride since good catalyst productivity is promoted. However, the mole ratios can vary from about 1:3 to 3:1. Generally, the total amount of organoaluminum compounds employed in a 1 liter reactor containing from about 0.06 to 0.2 g of catalyst calculated as TiCl$_3$ can range from about 4-12 mmoles and more preferably from about 8 to 10 mmoles. The calculated mole ratio of total organoaluminum compounds to TiCl$_3$ can range from about 25:1 to 1000:1 and more preferably from about 35:1 to 650:1 since highest productivity is favored in this range. The calculated mole ratio of total organoaluminum compounds to ester, e.g., ethyl anisate, in the cocatalyst can range from about 2.5:1 to 3.2:1, preferably 2.6:1 to 3.0:1, since good productivity coupled with good stereospecificity are found in these ranges. The calculated mole ratio of ester to TiCl$_3$ can range from about 10:1 to about 500:1.

Generally, the mole ratio of triaryl phosphite to metal chloride employed in the modified SMART catalysts ranges from about 0.5:1 to about 1:1. However, it can range from about 0.03:1 to about 6:1.

The SMART catalyst and the adjuvants are intensively milled together for about 0.5 to 100 hours at ambient conditions by means of a ball mill, rod mill, vibrating mill, and the like. Cooling of the mill can be employed, if desired, to keep the temperature of milling material within a specified temperature range, e.g., 25°-75° C., if desired. An atmosphere, inert in the process such as nitrogen, argon, etc., can be employed in the milling vessel.

It is within the scope of the invention to subject the milled titanium catalyst component to a suitable heat treatment to reduce the production of polymer solubles. The milled catalysts can be subjected to heat treatment at a temperature of about 50° C. to 250° C. under a pressure of about 0.5 psia to 5 psia (51–510 kPa) for a period of time ranging from about 10 minutes to about 5 hours.

The catalysts of this invention are suitable for the polymerization of at least one aliphatic mono-1-olefin containing 2 to 8 carbon atoms per molecule. The catalysts are particularly suitable for the stereospecific polymerization of propylene.

The conditions suitable for carrying out the polymerization reaction are similar to other related processes in which a catalyst system comprising reduced titanium is employed. The process is conveniently carried out in liquid phase in the presence or absence of an inert hydrocarbon diluent, e.g., n-heptane, n-pentane, isobutane, cyclohexane, etc., but it is not limited to liquid phase conditions. If no added diluent is used, the process can be carried out in liquid monomer which is preferred.

The polymerization temperature employed depends on the monomer employed and the mode of reaction selected but generally falls within the range of 60°-212° F. (15.5°-100° C.). In the liquid phase polymerization of propylene, for example, a temperature in the range of about 75° to about 200° F. (24°-93° C.) can be employed. Any convenient pressure is used. However, in liquid phase operation, sufficient pressure is employed to maintain the reactants in liquid phase within the reaction zone.

Gram atom ratios of Ti/Mg used in the catalyst preparation are preferably from 0.5:1 to 5:1, more preferably 0.75:1 to 1.25:1. Ratios below 0.5:1 are operable but give lower productivities. The actual ratio in the catalyst itself will be slightly lower than that used in its preparation.

As is known in the art, control of the molecular weight of the polymer is readily achieved by the presence of small amounts of hydrogen during the polymerization.

The polymers prepared with the catalysts of this invention are normally solid resinous materials which can be extruded, molded, etc., into useful articles including film, fibers, containers and the like.

EXAMPLE I

The SMART catalyst, already milled, is milled with an additive, e.g., SnCl$_4$, to modify it.

Preparation of Basic SMART Catalyst A (Control)

A 1 liter, spherical steel vessel containing 1400 g of 1.3 cm diameter steel balls was charged, in order, with 12.0 g (0.5 mole) of 50 mesh (U.S. Sieve Series) magnesium powder, 61 ml (0.5 mole, 53.5 g) of n-pentyl chloride, and 55 ml (0.5 mole, 94.8 g) of titanium tetrachloride. The vessel was placed on a Vibratom Model 6L-B mill (a vibratory mill manufactured by Siebtechnik GMBH, Mulheim, West Germany, which operates at a frequency of 1760 cycles per minute at an amplitude of about 9 mm) and a 3.7 hour milling time at ambient conditions was employed. The vessel was moved to a dry box where its contents were transferred to a 0.95 liter bottle and the bottle filled with dry n-hexane. The product was stored in this fashion for 11 weeks (for convenience) at about 23° C. then the product was recovered by filtering on a fritted funnel and washing with 3-800 ml portions of dry n-hexane. The washed material was vacuum dried about 6 hours and sieved through a 50 mesh screen yielding 75 g of a purple colored solid.

Catalyst B (Invention)

A 5 g sample of base SMART Catalyst A, already milled, and 0.36 ml $SnCl_4$ (0.80 g, 3.1 mmoles) was milled for 2.75 hours in a 250 ml steel vessel with 300 g of 0.95 cm steel balls on the Vibratom. Cooling tap water at about 20° C. was run over the vessel during the milling. Following milling, the vessel and contents were heated for 1 hour at 95° C. and cooled to about 23° C. before returning to the dry box. The grayish-brown sample was recovered by sieving through a 50 mesh screen. Catalyst B is calculated to contain about 86 wt. % Catalyst A and 14 wt. % $SnCl_4$. Since the base SMART catalyst is calculated to contain about 50 wt. % $TiCl_3$, a 5 g portion of it contains about 2.5 g (16.2 mmoles) of $TiCl_3$. In Catalyst B, therefore, the calculated mole ratio of $TiCl_3:SnCl_4$ is 5.2:1.

Catalyst C (Control)

A 5 g sample of base SMART Catalyst A, already milled, and 1.13 g triphenylphosphite (TPP) (3.6 mmoles) was milled for 2.8 hours on the Vibratom in the manner described for Catalyst B. The vessel and contents were post heated for 1 hour at 95° C. The recovered product was brown in color.

Catalysts D and E (Invention)

In two different 250 ml steel vessels, each containing 300 g of 0.95 cm steel balls, was charged 5 g of base SMART Catalyst A, already milled, 0.77 g TPP (2.5 mmoles), an 0.80 g $SnCl_4$. Each vessel was placed on the Vibratom and milled for 2.5 hours in the manner previously described. Catalyst D was recovered as before without undergoing any post heat treatment. Catalyst E was post heated and recovered in the manner described for Catalyst B. Catalysts D and E were red-brown in color. In each catalyst, Catalyst A is calculated to be about 76 wt. %, TPP to be 12 wt. % and $SnCl_4$ to be 12 wt. %. The calculated mole ratios are: $TiCl_3:TPP$ of 6.5:1 and $TiCl_3:SnCl_4$ of 5.2:1.

Catalysts F and G (Invention)

Two different 250 ml vessels were employed as for Catalysts D and E. One vessel was charged with 5 g of base SMART Catalyst A, already milled, 0.8 g $VCl_4$ (4.1 mmoles), and 0.8 g TPP (2.6 mmoles). The second vessel was charged with 5 g of base SMART Catalyst A, already milled, 0.8 g $SiCl_4$ (4.7 mmoles) and 0.8 g TPP. Each vessel was placed on the Vibratom and milled for 2 hours are described for Catalysts D and E. Each catalyst was post heated and recovered as before yielding reddish-brown material. Catalyst F is calculated to contain 76 wt. % Catalyst A, 12 wt. % TPP, and 12 wt. % $VCl_4$. The calculated mole ratios are: $TiCl_3:VCl_4$ of 4:1, $TiCl_3:TPP$ of 6.2:1. Catalyst G is calculated to contain 76 wt. % Catalyst A, 12 wt. % TPP, and 12 wt. % $SiCl_4$. The calculated mole ratios are: $TiCl_3:SiCl_4$ of 3.4:1 and $TiCl_3:TPP$ of 6.2:1.

Base SMART Catalyst $A^2$ (Control)

This is a repeat preparation of base SMART Catalyst A employing the same quantities of reagents and the same milling procedure as before except a milling time of about 5½ hours was utilized. The milling vessel containing the product was returned to the dry box and the contents flushed into a 0.95 liter bottle with dry n-hexane where the purple colored solid settled quickly. The liquid was decanted, replaced with fresh dry n-hexane, mixed with the product and the product allowed to settle. The decanting process was repeated three times. Then the solid material was filtered on a fritted funnel, washed with 3-800 ml portions of dry n-hexane, and vacuum dried for 4 hours. The product was sieved throug a 50 mesh screen yielding 70 g of a purple colored solid.

Catalyst H (Invention)

A 5 g sample of base SMART Catalyst $A^2$, already milled, 0.77 g TPP, and 0.80 g $SnCl^4$, was charged to a 250 ml vessel containing steel balls, placed on the Vibratom and milled for 4.5 hours in the manner described previously except that chilled water at about 10° C. was run over the vessel during milling. The vessel and contents were post heated for 1 hour at 95° C. and the contents recovered as described before yielding a brownish-maroon colored material. The weight ratios and calculated mole ratios employed are the same as for Catalysts D and E.

EXAMPLE II

Propylene was polymerized in a 1 liter stirred reactor employing the specified catalyst. The reactor was conditioned for each run by charging it with 900 ml of dry n-hexane containing 2.5 mmoles diethylaluminum chloride (DEAC) and heating reactor and contents to 120° C. for 1 hour. The contents were then pressured out with dry nitrogen and the nitrogen in turn purged with propylene vapors. The reactor was then cooled to about 23° C. The cocatalyst, a triethylaluminum/ethyl anisate complex (TEA/EA mole ratio of 3.5:1), was charged, then the catalyst, DEAC, 0.5 liter hydrogen (STP), and about a liter of liquid propylene. The reactor and contents were heated to 70° C. and polymerization conducted for 1 hour or as specified. Sufficient propylene was added as required from a pressurized reservoir during each run to maintain the reactor liquid full. After each run, the reactor contents were removed and the polymer was washed with methanol and dried under vacuum.

The quantities of components employed and results obtained are given in Tables 1A and 1B. Productivity is determined by dividing the polymer yield in grams by the catalyst weight in grams and is expressd as g polymer per g catalyst per unit time (usually 1 hour). Xylene soluble polymer is determined as known in the art by separation from the total polymer or aliquot thereof and calculating the weight percent thus separated.

TABLE 1A

Propylene Polymerization

| Comment | Run No. 1 Control | Run No. 2 Invention | Run No. 3 Control | Run No. 4 Invention | Run No. 5 Invention |
|---|---|---|---|---|---|
| Catalyst |  |  |  |  |  |
| Number | A | B | C | D | E[a] |
| Wt. % Component |  |  |  |  |  |
| Unmodified Base | 100 | 86 | 82 | 76 | 76 |
| TPP | 0 | 0 | 18 | 12 | 12 |
| $SnCl_4$ | 0 | 14 | 0 | 12 | 12 |
| Charged, mg | 44.1 | 29.0 | 18.3 | 19.0 | 26.0 |
| Calculated wt., $TiCl_3$, mg, (mmoles) | 22.05 (0.143) | 12.5 (0.081) | 7.50 (0.049) | 7.22 (0.047) | 9.88 (0.064) |
| Cocatalyst |  |  |  |  |  |
| Calculated mmoles |  |  |  |  |  |
| DEAC | 2.15 | 2.15 | 2.15 | 2.15 | 2.15 |
| TEA | 2.23 | 2.23 | 2.23 | 2.23 | 2.23 |
| EA | 1.65 | 1.65 | 1.65 | 1.65 | 1.65 |
| [b]Total Al Cpds/$TiCl_3$ | 31 | 54 | 89 | 93 | 68 |
| [b]Total Al Cpds/EA | 2.7 | 2.7 | 2.7 | 2.7 | 2.7 |
| [b]EA/$TiCl_3$ | 12 | 20 | 34 | 35 | 26 |
| Polymer Yield, g | 80.2 | 99.2 | 47.9 | 65.1 | 113.0 |
| Wt. % Xylene - Soluble Polymer | 12 | 12 | 10 | 7 | 7 |
| Calc. Productivity |  |  |  |  |  |
| g/g/hour | 1820 | 3110 | 2620 | 3430 | 4350 |

[a]Catalyst post heated 1 hour at 95° C.
[b]Mole ratios.

TABLE 1B

Propylene Polymerization

| Comment | Run No. 6 Invention | Run No. 7 Invention | Run No. 8 Control | Run No. 9 Invention | Run No. 10 Invention |
|---|---|---|---|---|---|
| Catalyst |  |  |  |  |  |
| Number | F | G | A[2] | H[(a)] | H[(a)] |
| Wt. % Component |  |  |  |  |  |
| Unmodified Base | 76 | 76 | 100 | 76 | 76 |
| TPP | 12 | 12 | 0 | 12 | 12 |
| $SnCl_4$ | 0 | 0 | 0 | 12 | 12 |
| $SiCl_4$ | 0 | 12 | 0 | 0 | 0 |
| $VCl_4$ | 12 | 0 | 0 | 0 | 0 |
| Charged, mg | 48.4 | 32.7 | 18.2 | 16.6 | 9.0 |
| Calculated $TiCl_3$ |  |  |  |  |  |
| mg | 18.4 | 12.4 | 9.1 | 6.31 | 3.42 |
| mmoles | 0.12 | 0.081 | 0.058 | 0.041 | 0.022 |
| Cocatalyst |  |  |  |  |  |
| Calculated mmoles |  |  |  |  |  |
| DEAC | 2.15 | 2.15 | 2.04 | 2.04 | 2.04 |
| TEA | 2.23 | 2.23 | 2.21 | 2.21 | 2.21 |
| EA | 1.65 | 1.65 | 1.65 | 1.65 | 1.65 |
| [c]Total Al Cpds/$TiCl_3$ | 36 | 54 | 73 | 104 | 193 |
| [c]Total Al Cpds/EA | 2.7 | 2.7 | 2.6 | 2.6 | 2.6 |
| [c]EA/$TiCl_3$ | 14 | 20 | 28 | 40 | 75 |
| Polymer Yield, g | 147.0 | 87.4 | 36.9 | 89.8 | 67.3 |
| Wt. Percent Xylene - Soluble Polymer | 9 | 10 | 14 | 8 | 7 |
| Calculated Productivity |  |  |  |  |  |
| g/g/hour | 3040 | 2670 | 2030 | 5410 | 7480[(b)] |

[(a)]Catalyst post heated 1 hour at 95° C.
[(b)]Run time of 2.5 hours.
[(c)]Mole ratios.

The results shown for the unmodified SMART catalyst in run 1 are typical, e.g., productivity of about 1800 g polypropylene per g catalyst per hour and about 12 wt.% of soluble polymer. Since some variation in productivity and soluble polymer formation can occur (runs 1, 8), it is important in comparing results that a given SMART catalyst and modifications thereof are directly compared. Thus, the results of runs 1-7 can be compared directly and runs 8-10 can be compared directly. Control run 3 shows that modifying the preformed SMART catalyst with TPP results in a somewhat more active catalyst while soluble polymer formation is reduced somewhat. Invention run 2 shows that modifying the preformed START catalyst with $SnCl_4$ gives a substantially more active catalyst while soluble polymer formation remains unchanged. Invention run 4 demonstrates that modifying preformed SMART catalyst with both $SnCl_4$ and TPP gives an even more active catalyst with decreased propensity for soluble polymer formation. The benefits derived from post heating the invention catalyst are evident in the results of invention runs 4 and 5. Thus, catalyst productivity is increased from about 3400 g polymer per g catalyst per hour to about 4300 by post heating the catalyst while soluble polymer formation is unchanged.

Marked improvement in catalyst activity and a decreased propensity for soluble polymer formation are also seen in invention runs 6 and 7 where the preformed SMART catalyst is modified with TPP and one of $VCl_4$ or $SiCl_4$. Invention run 10 demonstrates that the invention catalyst sustains excellent polymerization activity over at least a 2.5 hour period of time while soluble polymer formation remains relatively low.

EXAMPLE III

The SMART catalyst is prepared in the presence of an additive, e.g., $SnCl_4$. That product can be milled with $SnCl_4$ and TPP. Both types are modified SMART catalysts.

Catalyst I (Invention)

A 1 liter, spherical steel vessel containing 1400 g of 1.3 cm steel balls was charged, in order, with 11.0 g (0.45 mole) of 50 mesh magnesium powder, 48.3 g (0.45 mole) of n-pentyl chloride, 86.3 g (0.45 mole) of titanium tetrachloride, and 11.2 g (0.043 mole) of stannic chloride. The vessel was placed on the Vibratom and milled for 3.8 hours without employing cooling water. The violet-colored product was recovered similarly to that used for Catalyst A[2] and was found to weigh 71 grams. The base SMART catalyst was thus prepared by milling the components in the presence of 7.1 wt. % $SnCl_4$. For convenience, the catalyst can be described as SMART-$T_{7.1}$, the T indicating tin modified.

Catalyst J (Invention)

A 5 g sample of Catalyst I, already milled, 1.2 g (3.9 mmoles) of TPP, and 1.2 g (4.6 mmoles) of $SnCl_4$ were milled for 3 hours in the manner described for Catalyst B except no cooling water was employed. After milling, the vessel and contents were heated for 1 hour at 95° C. The brown colored sample was recovered as previously described. Catalyst J is calculated to contain about 68 wt. % SMART-$T_{7.1}$ and 16 wt. % each of TPP and $SnCl_4$.

Catalyst K (Invention)

A 1 liter spherical steel vessel containing 1400 g of 1.3 cm steel balls was charged, in order, with 12.0 g (0.5 mole) of 50 mesh magnesium powder, 53.5 g (0.5 mole) of n-pentyl chloride, 94.9 g (0.5 mole) of titanium tetrachloride, and 22.3 g (0.86 mole) of stannic chloride. The vessel was placed on the Vibratom and milled for 5 hours without employing cooling water. The milled sample was stored under dry n-hexane for 2 weeks before it was recovered as described for Catalyst A[2]. The purplish-maroon colored product weighed 80 g. The modified SMART catalyst was thus prepared by milling the components in the presence of 12.2 wt. % $SnCl_4$. For convenience, the catalyst can be described as SMART-$T_{12.2}$.

Catalyst L (Invention)

A 5 g sample of Catalyst K, already milled, 0.77 g of TPP, and 0.80 g of $SnCl_4$ were milled for 4.4 hours as described for Catalyst B. After milling, the vessel and contents were heated for 1 hour at 95° C. The recovered product was reddish-brown to purple in color. Catalyst L is calculated to contain about 76 wt. % SMART-$T_{12.2}$, and 12 wt. % each of TPP and $SnCl_4$.

Catalyst M (Invention)

The catalyst was prepared as described for Catalyst K except that the amount of $SnCl_4$ was increased to 44.6 g (0.17 mole) and that cooling water was employed. A milling time of 5.1 hours was used. The recovered tan-colored product weighted 65 g. The modified SMART catalyst was thus prepared by milling the components in the presence of 21.7 wt. % $SnCl_4$. For convenience, the catalyst can be described as SMART-$T_{21.7}$.

Catalyst N (Invention)

A 5 g sample of Catalyst M, already milled, 0.77 g of TPP, and 0.80 g of $SnCl_4$ were milled for 4.0 hours as described for Catalyst B. After milling, the vessel and contents were heated for 1 hour at 95° C. The recovered product was reddish-brown in color. Catalyst N is calculated to contain about 76 wt. % SMART-$T_{21.7}$, and 12 wt. % each of TPP and $SnCl_4$.

Catalyst O (Invention)

A 1 liter spherical steel vessel containing 1400 g of 1.3 cm steel balls was charged in order with 12.0 g (0.5 mole) of 50 mesh magnesium powder, 30.0 g (0.74 mole) of magnesium oxide powder (previously calcined for 16 hours at 538° C.), 53.5 g (0.5 mole) of n-pentyl chloride, and 94.9 g (0.5 mole) of titanium tetrachloride. The vessel was placed on the Vibratom and milled for 5.5 hours without employing cooling water. The milled sample was stored under dry n-hexane for 10 days before it was recovered as described for Catalyst A[2]. The yellowish-brown product weighed 110 g. The modified SMART catalyst was thus prepared by milling the components in the presence of 15.8 wt. % MgO. The recovered catalyst is calculated to contain 30/110 or 27.3 wt. % MgO. For convenience, the catalyst can be described as SMART-$MgO_{27.3}$.

Catalyst P (Invention)

A 5 g sample of Catalyst O, already milled, 0.77 g of TPP, and 0.80 g of $SnCl_4$ were milled on a roll mill for 8 hours. The components were charged to 250 ml steel vessel containing 300 g of 0.95 cm steel balls. After milling, the vessel and contents were heated for 1 hour at 95° C. The recovered product was reddish-brown in color. Catalyst P is calculated to contain about 76 wt. % SMART-$MgO_{27.3}$ and 12 wt. % each of TPP and additional $SnCl_4$. Since 5 g of SMART-$MgO_{27.3}$ is calculated to contain 1.365 g (33.9 mmoles) of MgO, 3.635 base SMART catalyst [5-(5×0.273)] which, in turn, contains about 50 wt. % $TiCl_3$ (11.8 mmoles), the following calculated mole ratios result: MgO:$TiCl_3$ of about 2.9:1, $TiCl_3$:TPP of about 4.7:1, and $TiCl_4$:$SnCl_4$ of about 3.8:1.

Catalyst Q (Invention)

The same quantities of materials as used for Catalyst P was charged to a 250 ml steel vessel containing 300 g of 0.95 cm steel balls. Milling was conducted on the Vibratom for 6.9 hours without employing cooling. After milling, the vessel and contents were heated for 1 hour at 95° C. The recovered product was reddish-brown in color. The weight and mole ratios are identical to those of Catalyst P.

Catalyst R (Invention)

A 1 liter spherical steel vessel containing 1400 g of 1.3 cm steel balls was charged in order with 30.0 g of poly(phenylene sulfide) powder of nominal 10 micron particle size as made according to U.S. Pat. No. 3,354,129, issued to Edmonds et al on Nov. 21, 1967 and which a melting point of about 288° C., 12.0 g (0.5 mole) of 50 mesh magnesium powder, 53.5 g (0.5 mole) of n-pentyl chloride, 44.5 g (0.17 mole) of stannic chloride, and 94.9 g (0.5 mole) of titanium tetrachloride. The vessel was placed on the Vibratom and milled for 5.4 hours without employing cooling water. The sample was recovered as described for Catalyst O. It was colored tan and weighed 95 g. The modified catalyst was thus prepared by milling the components in the presence of 13 wt. % poly(phenylene sulfide) (PPS) and 19 wt. % $SnCl_4$. The recovered catalyst is calculated to contain 30/95 or 31.6 wt. % PPS. For convenience, the catalyst can be described as SMART-$PPS_{31.6}$-T, the final tin content not precisely known.

Catalyst S (Invention)

A 5 g sample of Catalyst R, already milled, 0.77 g of TPP, and 0.80 g of $SnCl_4$ were milled for 4.8 hours as described for Catalyst B. After milling, the vessel and contents were heated for 1 hour at 95° C. The recovered product was reddish-brown in color. Catalyst S is calculated to contain about 76 wt.% SMART-$PPS_{31.6}$-T and 12 wt.% each of TPP and additional $SnCl_4$.

EXAMPLE IV

Propylene was polymerized using specified amounts of catalyst samples in the manner described in Example II.

The quantities of components employed and results obtained are presented in Tables 2A and 2B.

TABLE 2A

| | Invention Propylene Polymerization Runs | | | | | | | |
|---|---|---|---|---|---|---|---|---|
| Run No. | 11 | 12 | 13 | 14 | 15 | 16 | 17 | 18 |
| Catalyst | | | | | | | | |
| Number | I | J | K | L | L | M | N | N |
| Wt. % Component | | | | | | | | |
| Modified Base | 100 | 68 | 100 | 76 | 76 | 100 | 76 | 76 |
| TTP | 0 | 16 | 0 | 12 | 12 | 0 | 12 | 12 |
| $SnCl_4$ (Additional) | 0 | 16 | 0 | 12 | 12 | 0 | 12 | 12 |

TABLE 2A-continued

| | Invention Propylene Polymerization Runs | | | | | | | |
|---|---|---|---|---|---|---|---|---|
| Run No. | 11 | 12 | 13 | 14 | 15 | 16 | 17 | 18 |
| Charged, mg. | 16.7 | 17.1 | 22.4 | 17.7 | 8.5 | 28.5 | 17.8 | 14.3 |
| Cocatalyst | | | | | | | | |
| Calculated mmoles | | | | | | | | |
| DEAC | 2.17 | 2.11 | 2.04 | 2.04 | 2.04 | 2.04 | 2.04 | 2.04 |
| TEA | 2.16 | 2.21 | 2.20 | 2.20 | 2.20 | 2.20 | 2.20 | 2.20 |
| EA | 1.65 | 1.65 | 1.65 | 1.65 | 1.65 | 1.65 | 1.65 | 1.65 |
| (b)Total Al Cpds/TiCl$_3$ | —(a) | — | — | — | — | — | — | — |
| (b)Al Cpds/EA | 2.6 | 2.6 | 2.6 | 2.6 | 2.6 | 2.6 | 2.6 | 2.6 |
| (b)EA/TiCl$_3$ | — | — | — | — | — | — | — | — |
| Polymer Yield, g | 32.6 | 89.5 | 50.5 | 89.4 | 64.0 | 62.4 | 98.0 | 115.7 |
| Wt. Percent Xylene - Soluble Polymer | 9 | 7 | 8 | 6 | 7 | 7 | 6 | 6 |
| Calc. Productivity g/g/hour | 1950 | 5230 | 2250 | 5050 | 7530(c) | 2190 | 5510 | 8090(c) |

(a)A dash signifies not determined since the exact amount of TiCl$_3$ in each catalyst is not known.
(b)Mole Ratios.
(c)Run time of 2.5 hours.

TABLE 2B

| | Invention Propylene Polymerization Runs | | | | | | | |
|---|---|---|---|---|---|---|---|---|
| Run No. | 19 | 20 | 21 | 22 | 23 | 24 | 25 | 26 |
| Catalyst | | | | | | | | |
| Number | O | P | P | Q | Q | R | S | S |
| Wt. % Component | | | | | | | | |
| Modified Base | 100 | 76 | 76 | 76 | 76 | 100 | 76 | 76 |
| TPP | 0 | 12 | 12 | 12 | 12 | 0 | 12 | 12 |
| SnCl$_4$ (Additional) | 0 | 12 | 12 | 12 | 12 | 0 | 12 | 12 |
| Charged, mg | 26.1 | 26.0 | 23.7 | 36.3 | 27.7 | 26.3 | 15.0 | 9.0 |
| Calc. TiCl$_3$ | | | | | | | | |
| mg | 3.6 | 2.7 | 2.5 | 7.5 | 5.7 | 4.2 | 1.8 | 1.1 |
| mmoles | 0.023 | 0.018 | 0.016 | 0.024 | 0.035 | 0.027 | 0.012 | 0.007 |
| Cocatalyst | | | | | | | | |
| Calculated mmoles | | | | | | | | |
| DEAC | 2.04 | 2.04 | 2.04 | 2.04 | 2.04 | 2.04 | 2.04 | 2.04 |
| TEA | 2.20 | 2.20 | 2.20 | 2.20 | 2.20 | 2.20 | 2.20 | 2.20 |
| EA | 1.65 | 1.65 | 1.65 | 1.65 | 1.65 | 1.65 | 1.65 | 1.65 |
| (a)Total Al Cpds/TiCl$_3$ | 184 | 235 | 265 | 175 | 121 | 157 | 353 | 606 |
| (a)Total Al Cpds/EA | 2.6 | 2.6 | 2.6 | 2.6 | 2.6 | 2.6 | 2.6 | 2.6 |
| (a)EA/TiCl$_3$ | 72 | 92 | 103 | 69 | 47 | 61 | 137 | 236 |
| Polymer Yield, g | 54.5 | 70.2 | 82.0 | 103.4 | 105.5 | 52.0 | 42.4 | 39.8 |
| Wt. Percent Xylene - Soluble Polymer | 6 | 6.5 | 5 | 6 | 6 | 7 | 6.5 | 6 |
| Calc. Productivity g/g/hour | 2090 | 2690 | 3460(b) | 2850 | 3810(b) | 1980 | 2830 | 4060(b) |

(a)Mole ratios
(b)Run time of 2.5 hours.

Inspection of the results presented in Tables 2A and 2B reveals that the modified SMART catalysts prepared according to Example III are active propylene polymerization catalysts which are either more active than the unmodified SMART catalyst or form less soluble polymer than the unmodified SMART catalyst (see runs 1, 8 of Tables 1A, 1B) or are both more active and form less soluble polymer.

Runs 20 and 21 show results for a catalyst prepared by ball milling on a rotary mill and runs 22 and 23 give results for a catalyst of the same composition prepared by ball milling on a vibratory mill. At approximately the same milling periods (8 hours roll milling vs 7 hours vibratory milling) the results indicate a slight edge in favor of vibratory ball milling.

As runs 19 and 24 indicate, modified SMART catalysts prepared in the presence of MgO or PPS, respectively, have about the same polymerization activity as unmodified SMART catalysts but make less soluble polymer. The modified catalysts in turn can be milled in the presence of SnCl$_4$ and TPP to substantially improve their polymerization activity while soluble polymer formation remains about the same.

Regardless of how the improved catalysts of this invention are prepared it has been found to be very beneficial to post heat them at about 100° C. for about 1 hour to improve their polymerization activity.

I claim:
1. A process comprising:
   (a) contacting
      (1) magnesium metal,
      (2) an organic halide of the formula RX or R'X$_2$ where X represents a halogen, R is selected from alkynyl, alkenyl, alkyl, aryl, cycloalkenyl or cycloalkyl radicals and combinations thereof containing from 1 to 12 carbon atoms per molecule and R' is a saturated divalent aliphatic hydrocarbyl radical,
      (3) titanium tetrahalide, and subjecting same to intensive milling in the absence of a complexing diluent;
   (b) milling the entire reaction product of (a) with

(4) at least one of tin tetrahalide, vanadium tetrahalide and silicon tetrahalide, (5) in the presence or absence of a triaryl phosphite, and (c) thereafter activating the thus produced catalyst component of (b) by contacting same with (6) an organoaluminum activator.

2. A process according to claim 1 wherein said milling in (a) (3) is carried out in the absence of any extraneous diluent but in the presence of a triaryl phosphite and (5) is a compound of the formula $(R''''O)_3P$ where $R''''$ is aryl, alkyl-substituted aryl, cycloalkyl-substituted aryl and aryl-substituted aryl wherein the basic unsubstituted aryl has from 6 to 14 carbon atoms and the alkyl, cycloalkyl and aryl substituents have 1 to about 10 carbon atoms, and said tin tetrahalide is tin tetrachloride.

3. A process according to claim 1 wherein said milling in (b) is carried out in the presence of triphenyl phosphite and tin tetrachloride, vanadium tetrachloride or silicon tetrachloride.

4. A process according to claim 1 wherein said milling in (b) is carried out in the presence of tin tetrachloride, vanadium tetrachloride, or silicon tetrachloride and the resulting milled product is heated treated prior to combining with (6).

5. A process according to claim 4 wherein said milling is carried out in the presence of triphenyl phosphite.

6. A process according to claim 1 wherein (3) is titanium tetrachloride, (2) is a compound of the formula RX in which X represents chlorine or bromine and R is selected from an alkenyl, alkyl, aryl, or cycloalkyl radical having 1 to 12 carbon atoms, and (6) comprises a compound having a formula selected from $AlR''_3$, $R''_2AlZ$, $R''AlZ_2$ and $R''_2AlOR''$ wherein each $R''$ represents an alkyl group containing 1 to 12 carbon atoms per molecule, Z represents a halogen or hydrogen, and wherein said milling is carried out at a temperature within the range of 40°–110° C.

7. A process according to claim 1 wherein said activator contains at least one polar organic adjuvant which is an electron donor.

8. A process according to claim 7 wherein said adjuvant is ethyl anisate.

9. A process according to claim 1 wherein said milling is done by ball milling and wherein said organoaluminum activator consists essentially of triethylaluminum, diethylaluminum chloride, and ethyl anisate, and an atom ratio of magnesium to titanium is within the range of 0.75:1 to 1.25:1.

10. A process according to claim 1 wherein said (6) organoaluminum activator comprises a trialkylaluminum compound, a polar organic adjuvant which is an electron donor and a dialkylaluminum compound coactivator.

11. A process according to claim 1 wherein said (2) organic halide is n-pentyl chloride, said (3) titanium tetrahalide is titanium tetrachloride, said (6) organoaluminum activator is triethylaluminum plus ethyl anisate and diethylaluminum chloride, said (4) is tin tetrachloride, vanadium tetrachloride, or silicon tetrachloride, and said (5) is triphenyl phosphite.

12. A process according to claim 1 wherein the product obtained in (b) is heat treated prior to combining with (6).

13. A catalyst according to claim 1.

14. A catalyst according to claim 3.

15. A catalyst according to claim 9.

16. A process comprising:
(a) combining magnesium metal, an organic halide of the formula RX or $R'X_2$ where X represents a halogen, R is selected from alkynyl, alkenyl, alkyl, aryl, cycloalkenyl or cycloalkyl radicals or combinations thereof containing from 1 to 12 carbon atoms per molecule and R' is a saturated divalent aliphatic hydrocarbyl radical and titanium tetrahalide with at least one of tin tetrachloride, vanadium tetrachloride, and silicon tetrachloride, and, optionally, at least one of magnesium oxide, a triaryl phosphite, and a polymeric material selected from polypropylene, poly(phenylene sulfide) and poly(phenylene oxide), and subjecting same to intensive milling in the absence of any extraneous diluent to form a titanium catalyst component; and (b) thereafter contacting said titanium catalyst component with an organoaluminum activator.

17. A process according to claim 16 wherein said organic halide is a compound of the formula RX wherein X represents said chlorine or bromine and R is selected from an alkenyl, alkyl, aryl, or cycloalkyl radical having 1 to 12 carbon atoms, said titanium tetrahalide is titanium tetrachloride, said triaryl phosphite is triphenyl phosphite, said polymeric material is poly(phenylene sulfide) and said organoaluminum activator is a compound having a formula selected from $AlR''_3$, $R''_2AlZ$, $R''AlZ_2$ and $R''_2AlOR''$ wherein each $R''$ represents an alkyl group containing 1 to 12 carbon atoms, Z is a halogen or hydrogen.

18. A process according to claim 16 wherein said activator contains at least one polar organic adjuvant which is an electron donor.

19. A method according to claim 18 wherein said adjuvant is ethyl anisate.

20. A process according to claim 18 wherein a molar ratio of said titanium compound to said adjuvant is within the range of 1:1 to 200:1, an atom ratio of said aluminum to said titanium is within the range of 40:1 to 150:1, and said organic halide and magnesium metal are added in about stoichiometric amounts.

21. A process according to claim 16 wherein said titanium tetrahalide is titanium tetrachloride, said organic halide is n-pentyl chloride, said triaryl phosphite is triphenyl phosphite, and said organoaluminum activator is triethylaluminum plus ethyl anisate and diethylaluminum chloride.

22. A process according to claim 16 wherein said milled titanium catalyst component is heat treated prior to combining with (b).

23. A catalyst produced by the method of claim 16.

24. A catalyst produced by the method of claim 21.

25. A process comprising:
(a) combining an organic halide of the formula RX or $R'X_2$ where X represents a halogen, R is selected from alkynyl, alkenyl, alkyl, aryl, cycloalkenyl or cycloalkyl radicals and combinations thereof containing from 1 to 12 carbon atoms per molecule and R' is a saturated divalent aliphatic hydrocarbyl radical, a titanium tetrahalide and magnesium metal and subjecting same to intensive milling in the presence of at least one of tin tetrachloride, vanadium tetrachloride, silicon tetrachloride, aluminum trichloride, magnesium oxide, and a polymer material selected from polypropylene, poly(phenylene sulfide) and poly(phenylene oxide);

(b) milling the entire reaction product of (a) with additional amounts of at least one of tin tetrachloride, vanadium tetrachloride, silicon tetrachloride, aluminum trichloride, magnesium oxide, and a polymeric material selected from polypropylene, poly(phenylene sulfide) and poly(phenylene oxide) and in the presence of a triaryl phosphite to produce a titanium catalyst component; and (c) thereafter contacting said titanium catalyst component with an organoaluminum activator.

26. A process according to claim 25 wherein said titanium tetrahalide is titanium tetrachloride, said organic halide is n-pentyl chloride, said triaryl phosphite is triphenyl phosphite, said polymeric material is poly(phenylene sulfide), and said organoaluminum activator is triethylaluminum plus ethyl anisate and diethylaluminum chloride.

27. A process according to claim 25 wherein said milled product of (b) is heat treated prior to combining with (c).

28. A catalyst produced by the method of claim 25.

29. A catalyst produced by the method of claim 26.

* * * * *